March 10, 1970    P. M. SWEENEY ET AL    3,499,255
APPARATUS FOR ISOLATING VIBRATIONS
Original Filed April 16, 1963    7 Sheets-Sheet 1

INVENTORS
LAURENCE L. EBERHART
PATRICK M. SWEENEY
BY
Schmieding and Fultz
ATTORNEYS

INVENTORS
LAURENCE L. EBERHART
PATRICK M. SWEENEY
BY
ATTORNEYS

THEORETICAL VIBRATION ISOLATION CURVES

VIBRATION ISOLATION FOR 1-INCH THICK GLASS FIBER MATERIAL

VIBRATION ISOLATION FOR 2-INCH THICK GLASS FIBER MATERIAL

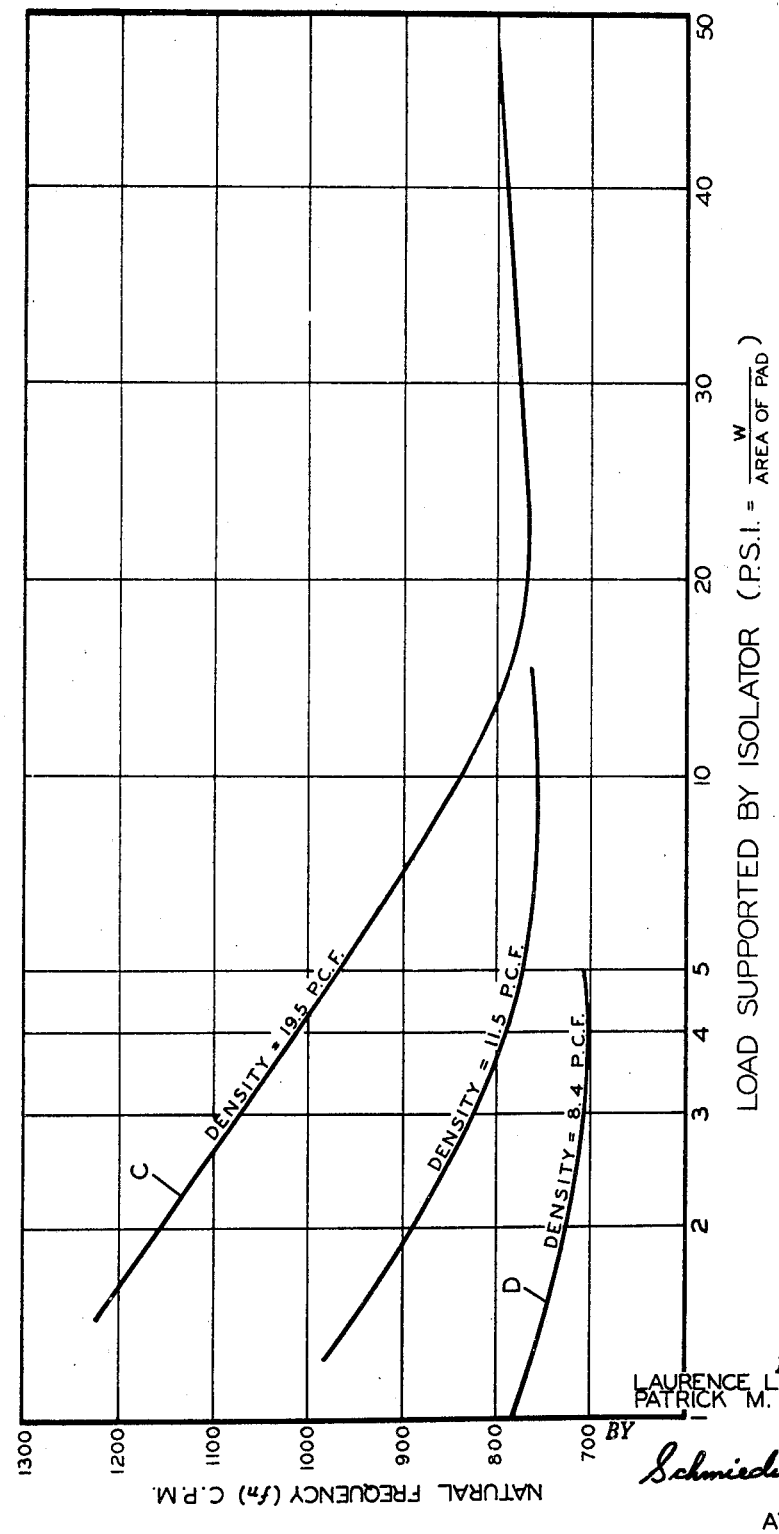

United States Patent Office 3,499,255
Patented Mar. 10, 1970

3,499,255
APPARATUS FOR ISOLATING VIBRATIONS
Patrick M. Sweeney, Dayton, and Laurence L. Eberhart, Columbus, Ohio, assignors to Consolidated Kinetics Corporation, Columbus, Ohio, a corporation of Ohio
Continuation of application Ser. No. 273,530, Apr. 16, 1963. This application Feb. 17, 1967, Ser. No. 632,853
Int. Cl. E04b *1/98, 1/62;* E04f *15/22*
U.S. Cl. 52—263    4 Claims

ABSTRACT OF THE DISCLOSURE

A vibration isolation floor construction for supporting vibration sensitive and vibration producing machines, equipment and the like. The floors uniquely comprise pads of glass fiber material which are uniquely formed so as to maintain constant natural frequencies under variations in loading. In particular, the floor constructions are constructed and loaded in accordance with uniquely fabricated isolation pads. In addition, the floor constructions can be fabricated in accordance with a formula which has been established to provide the above mentioned meritorious advantages.

---

This invention relates to supporting structures for isolating apparatus from environmental vibrations and for isolating vibration and shock inducing appartus from adjacent areas.

The present invention relates particularly to vibration isolation floor constructions for supporting vibration sensitive and vibration producing machines, equipment, and the like.

This application is a continuation of my co-pending application Ser. No. 273,530 filed Apr. 16, 1963, now abandoned which is a continuation-in-part of co-pending application Ser. No. 37,526 filed June 20, 1960, now abandoned, which is a continuation-in-part of Ser. No. 818,201 filed June 4, 1959, now abandoned.

It has been discovered, in accordance with the present invention, that certain pads of glass fiber material are uniquely excellent for isolating vibrations provided the density of the material is greater than eight pounds per cubic foot, the diameters of the glass fibers are less than .00050 of an inch, and the lengths of the glass fibers are disposed transversely of the direction of load application. For example, fiber diameters between .00020 of an inch and .00024 of an inch gives excellent results in most applications. It has been found that fiber diameters greater than .00060 of an inch result in natural frequencies that are too high for achieving effective vibration isolation and, moreover, pads formed thereof are characterized by inadequate load bearing characteristics. By careful selection of glass fiber diameters, of the air space between the individual fibers, the density, and loading, glass fiber performs like a damped, non-linear spring due to the elasticity of the glass and the pumping action of the entrapped air. Compressing the glass fiber to heavy densities comparable to balsa wod or soft pine, large loads per unit area can be carried by the glass fiber and the damped non-linear spring action is retained.

It has been further discovered in accordance with the present invention that improved vibration isolation supports having a constant natural frequency under variations in the weight of the load being supported can be fabricated in accordance with the equation $$W = W_0 e^{A(d-d_0)}$$

said equation to be described in detail later herein.

There are two aspects to the problem of vibrations isolation: First, the isolation of forces of the type created by rotating and reciprocating machinery, such as fans, compressors, electric motors, and diesel engines; and second, the isolation of motions such as occur in airplanes, ships, vehicles, industrial buildings, offices, and even residential buildings.

The principal objective in the first mentioned aspect is the reduction in the magnitude of the force transmitted to the support for the machinery.

In the second aspect, the principal objective is a reduction in the vibration amplitude so that the mounted equipment or occupants will be subjected to vibration of less severity than the supporting structure.

The general principle, in both cases, is to mount the equipment upon resilient supports or isolators in such a manner that the natural frequency of the equipment-and-isolator system is substantially lower than the frequency of the vibration to be isolated.

Various densities of glass fiber have a load bearing range in which deflection occurs comparable to that of a non-linear spring. As the glass fiber is compressed under load, the natural frequency of the load-and-glass fiber system becomes lower, similar to a non-linear spring. Because of the low natural frequency of the deflected glass fiber under load, its use for vibration isolators becomes apparent.

In general, the supporting structures of the present invention include pads of glass fiber material which support and isolate rigid floors.

In accordance with the present invention, the novel vibration isolation supports most effectively utilize the previously mentioned vibration isolating property of glass fiber pads for maintaining a constant natural frequency under variations in the weights of the loads being supported. Moreover, the vibration isolation supports of the present invention possess excellent internal damping characteristics whereby the supported apparatus are most effectively isolated from the environment so far as the transmission of positive and negative vibrations is concerned.

It is another aspect of the present invention to provide a novel floor construction of simple and inexpensive design that utilizes standardized structural components.

It is another object of the present invention to provide a novel floor construction that utilizes spaced glass fiber isolator pads of standard size and density that can be selectively positioned at various spacings so as to load the system in accordance with the equation $W = W_0 e^{A(d-d_0)}$ so as to provide a constant natural frequency under variations in the weight of the load being supported.

It is another aspect of the present invention to provide a novel inexpensive floor construction that utilizes coated glass fiber pads that include upper and lower surfaces provided with layers of mastic covered by pull-off type sheets of backing material which construction permits the joining together of a plurality of stacked isolator pads at confronting bonded surfaces.

It is another aspect of the present invention to provide a novel inexpensive floor construction that utilizes coated glass fiber pads that include a surface provided with a layer of mastic covered by a pull-off type sheet of backing material which construction permits the securing of the isolator pad to a substructure surface or a superstructure surface.

It is another object of the present invention to provide a novel isolator supporting floor construction which utilizes simple standardized isolator pads as the sole supporting structure between a foundation and the isolated supporting floor on which the rotating machine is mounted.

It is another object of the present invention to provide a novel isolated supporting floor which is of sunken construction so as to be flush with the surrounding floor surface.

Further objects and advantages of the present invention will be apparent from the following description, reference being had to the accompanying drawings wherein preferred forms of embodiments of the invention are clearly shown.

In the drawings:

FIG. 11 is a graph showing the relationship between natural frequencies and variations in loads being supported by vibration isolation supports constructed in accordance with the present invention.

Figure 1:
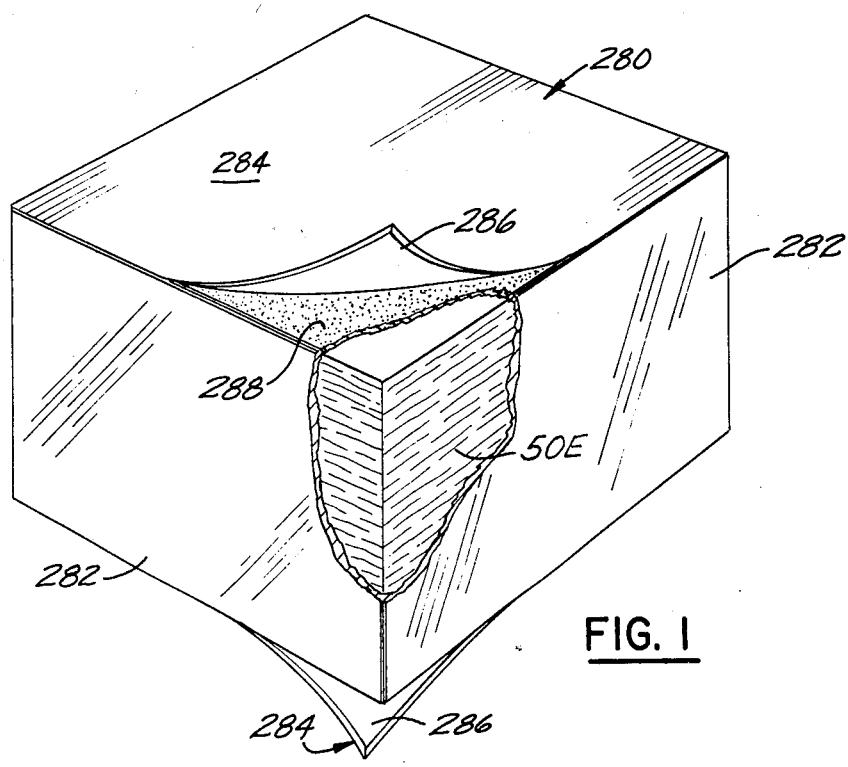
FIG. 1 is a perspective view of a vibration isolator pad utilized in the floor support constructions of the present invention.
Figure 2:
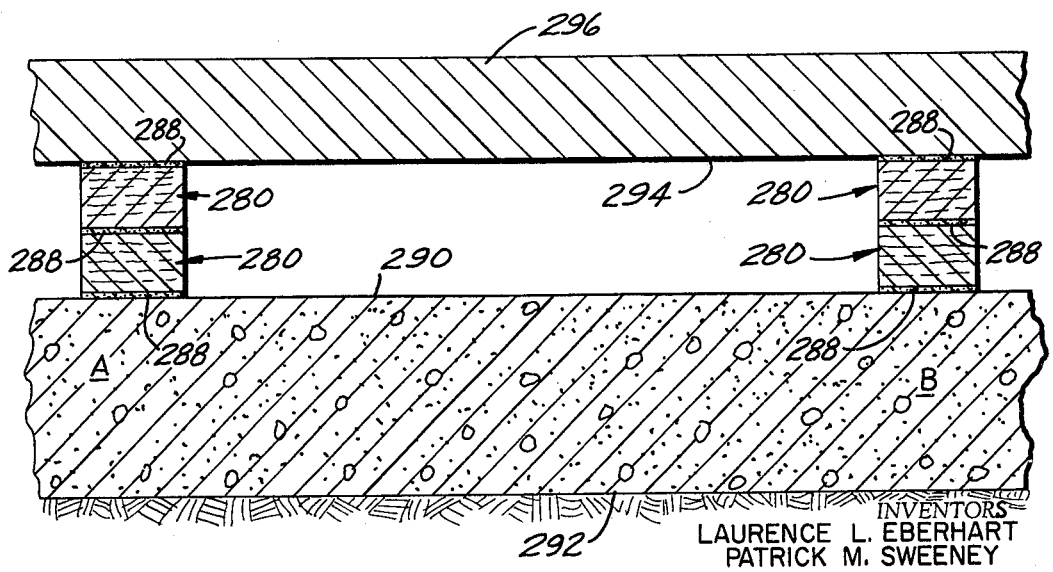
FIG. 2 is a simple assembly view illustrating the isolator pads of FIG. 10 in superimposed stacked and joined relationship between typical substructure and isolated superstructure.

Referring in detail to the drawings, FIGS. 1 and 2 illustrate an isolator pad construction that is particularly useful as an inexpensive means for supporting floors for electronic machinery, pumps, motors, and other machinery in isolated relationship with a concrete slab subfoundation.

One of the isolator pads is indicated generally at 280 and includes a pad of glass fiber material 50-E that is provided with a flexible covering 282 provided on the four sides and top and bottom surfaces.

In the interest of providing a low cost isolator pad 280 the covering preferably comprises a film of polyethylene, polyvinyl chloride, or other similar low cost resinous film material that is impervious to moisture and air.

The resinous covering for isolator pad 282 is preferably applied in sheet form by vacuum applying a sheet to the top and sides and then by next applying another sheet to the bottom surface using a suitable solvent to join the overlapping portions of the sheets to provide a secured envelope that is impervious to moisture and air.

As an alternative when minimum cost is not a factor, the impervious coating 282 can be provided by spraying the pad 50-E with an elastomer, such as neoprene, dispersed in a suitable solvent.

As previously stated herein, the density of the material is greater than 8 pounds per cubic foot and the fiber diameters is less than .00050 of an inch. The fibers that make up the pad 50 extend transversely of the direction of load application; i.e. substantially horizontal as the pad 50-E is viewed in FIGS. 1 and 2. It should be pointed out that the horizontally extending fibers, that make up the pad, are bonded together with a suitable resinous binder, under heat and pressure, to a density of 8 pounds per cubic foot or greater, it being understood that various densities greater than 8 pounds per cubic foot, various fiber diameters less than .00050 of an inch, and various pad thicknesses and widths may be utilized, depending upon the particular application, without departing from the spirit of the present invention.

A pull-off type tape indicated generally at 284 which comprises a sheet of backing material 286, formed of paper or the like, and a layer 288 of mastic is next secured to the top and bottom surfaces of covering 282 such that when the backings 286 are peeled off the unhardened mastic 288 is exposed for attachment to the top surface 290 of a substructure or structural floor 292 or the under surface 294 of a superstructure or supported floor 296.

FIG. 2 illustrates a typical assembly that includes a plurality of spaced isolator stations formed by stacking a plurality of isolator pads 280 at each of the stations.

FIG. 2 illustrates, in exaggerated perspective, the various layers of mastic 288 that secure the isolator pads together and to substructure 292 and superstructure 296.

Figure 3:
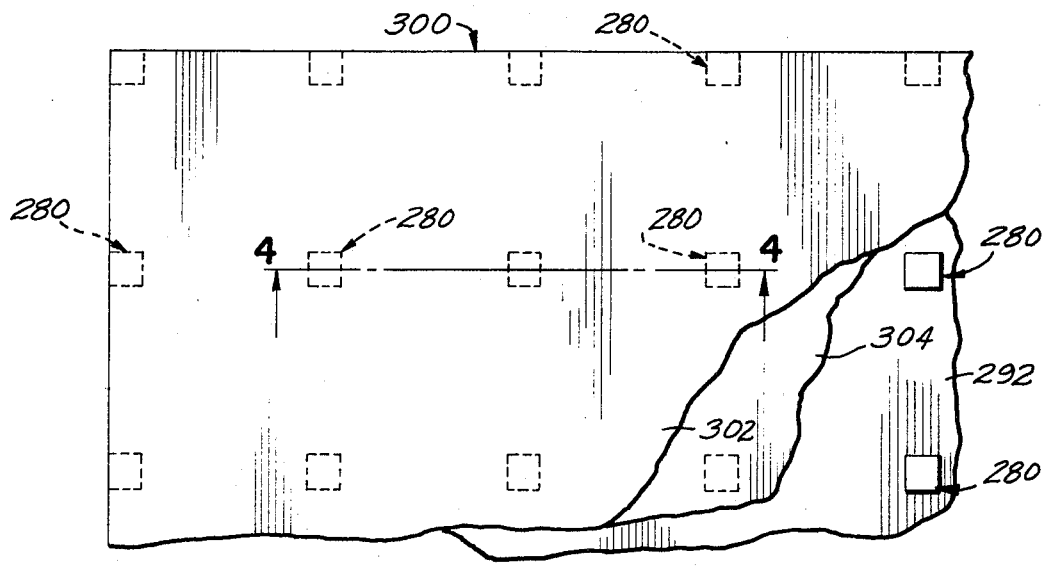
FIG. 3 is a partial plan view of a typical floor construction utilizing the isolator pads construction of FIG. 1.
Figure 4:
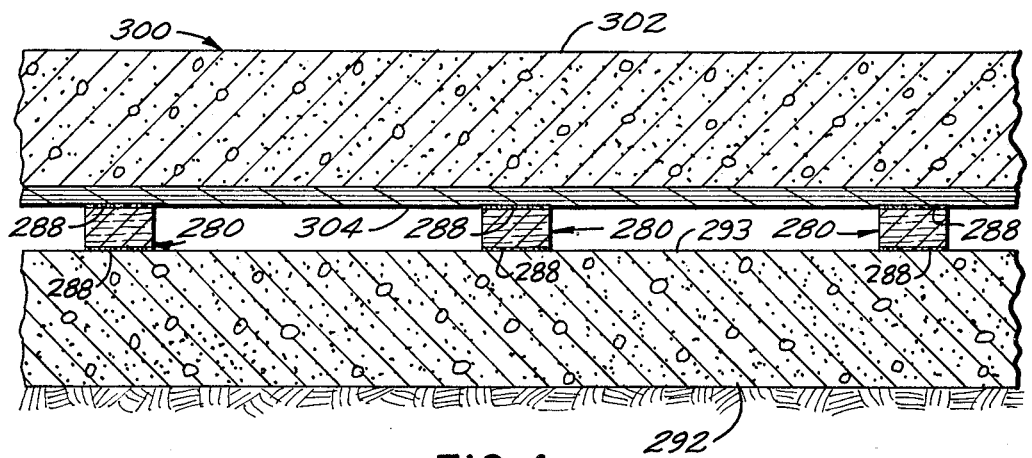
FIG. 4 is a partial side sectional view of the floor construction of FIG. 3, the section being taken along the line 4—4 of FIG. 3.

Reference is next made to FIGS. 3 and 4 which illustrate a specific floor construction of the type used for rooms containing sensitive apparatus such as electronic computers or the like.

A concrete foundation or subfloor is indicated generally at 292. This is generally in the form of a conventional poured concrete slab with the upper surface 293 being finished as level as possible.

Figure 10:
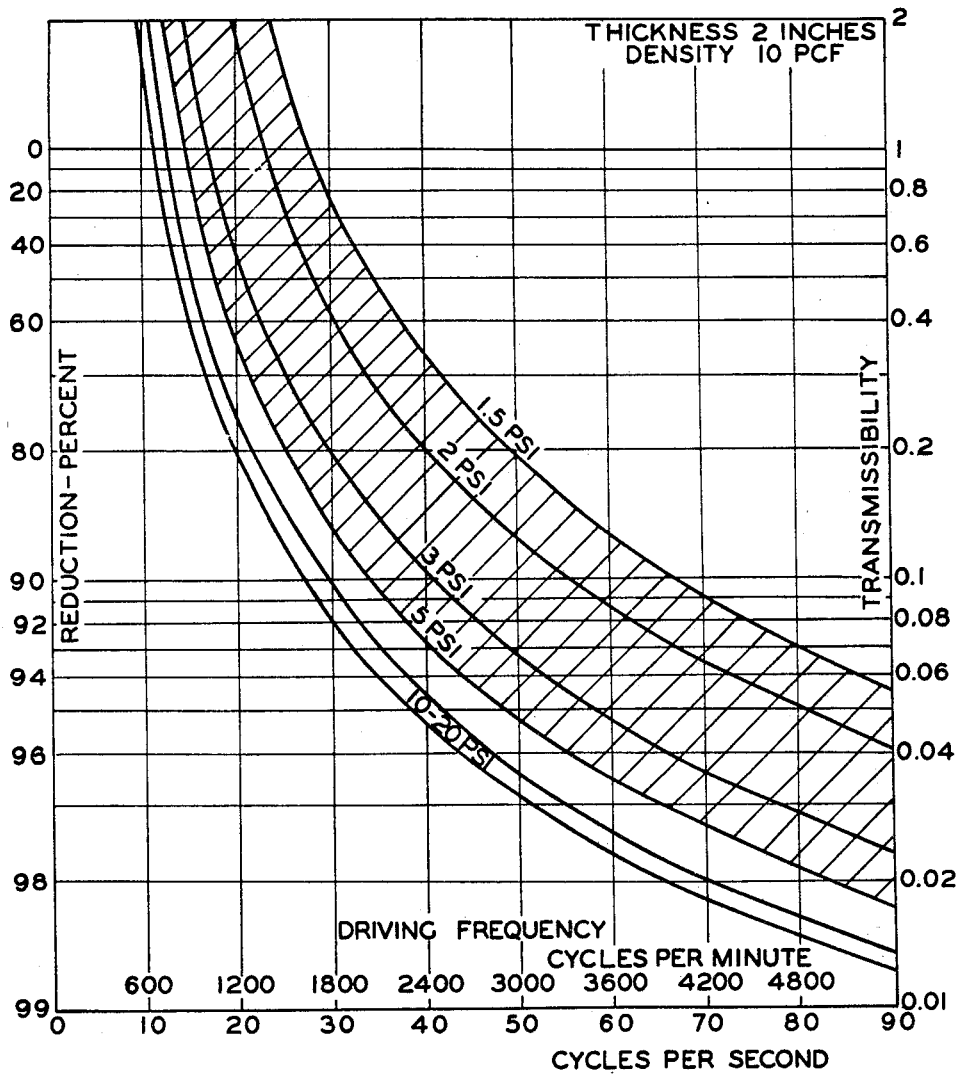
FIG. 10 is a graph showing the vibration isolation characteristics of two-inch thick glass fiber material.

A plurality of the previously described isolators 280 constructed in accordance with FIG. 10 are mounted on slab 292 in spaced relationship to provide the desired loading per unit area required to provide a finished system that functions in accordance with the formula set forth in the present specification and the claims that follow.

A layer of sheathing 312, formed of plywood or the like, is next placed over the isolators 280.

The supported and isolated floor 302 is preferably formed by pouring a concrete slab on sheathing 304 with the upper surface of the top slab being finished as level as possible.

If desired, a finished layer of flooring can be laid on the top surface of slab 302.

Figure 5:
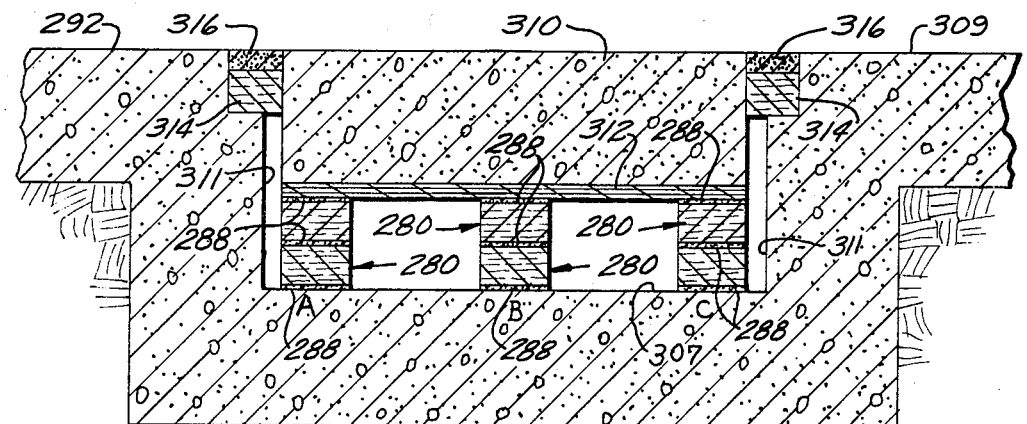
FIG. 5 is a side sectional view of the isolator floor construction of FIG. 6.
Figure 6:
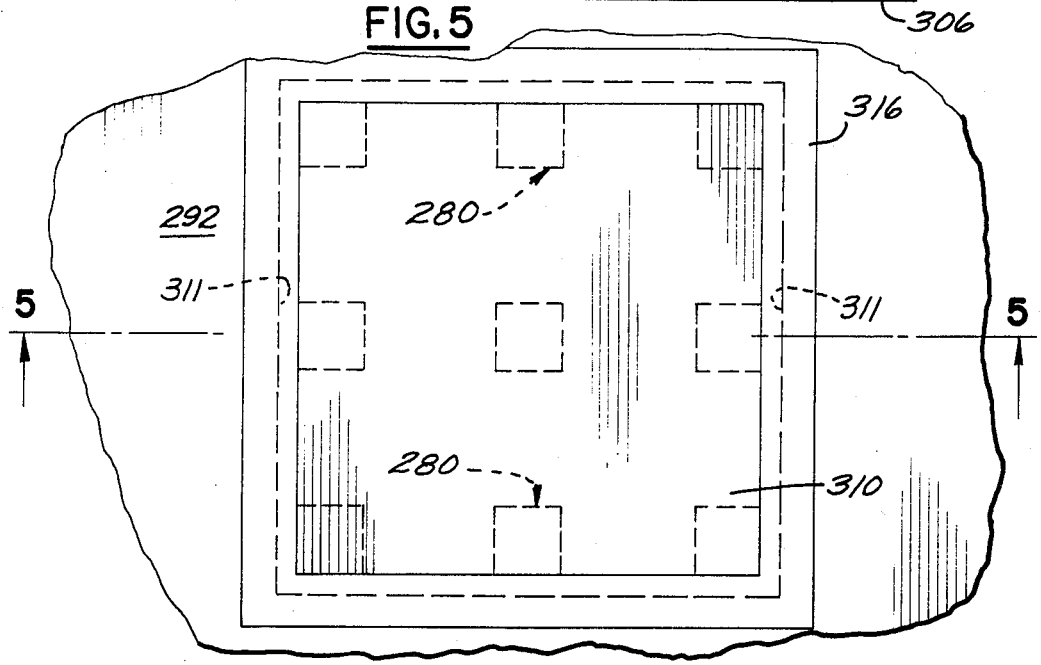
FIG. 6 is a plan view of an isolator floor construction, which construction utilizes the isolator pad construction of FIG. 1.

Reference is next made to FIGS. 5 and 6, which illustrate a flush-type isolator floor construction particularly adapted for supporting rotating machinery such as pumps, blowers and the like.

The construction of FIGS. 5 and 6 includes a sunken concrete basin 306 that includes a surface 307 located below the floor level 309 formed by the main foundation slab 292.

The various isolator stations A, B, and C, FIG. 5, are formed either by a single isolator 280 or by a plurality of isolators joined together and stacked in the manner in connection with FIG. 2.

A layer of sheathing 312 and a pured slab 310 are supported by the isolators in spaced relationship from the side walls 311 of basin 306.

The spaces around isolated slab 310 are preferably sealed by strips 314 of glass fiber material or other suitable padding covered by a layer 316 of mastic.

Figure 7:
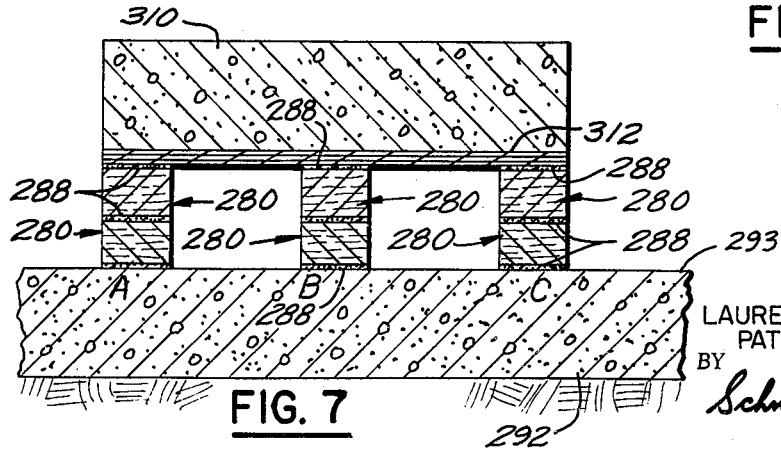
FIG. 7 is a side sectional view of a modified isolator floor construction utilizing the isolator pad construction of FIG. 1.

Reference is next made of FIG. 7 which illustrates a second isolated floor construction which is identical to the construction of FIGS. 5 and 6, previously described, except that the isolated slab 310 is raised above the surrounding surface 293 of the foundation slab 292.

It should be pointed out that the glass fiber pads 280 are not impregnated with bonding type elastomers, but merely include a sprayed on coating of the previously mentioned suitable resinous binder which bonds the fibers together at their cross-wise oriented intersections to provide the previously mentioned air spaces between the individual fibers. This provides a non-linear spring action which results from the pumping action of the entrapped air.

The above described glass fiber pads that include the air spaces between the individual fibers and provide the damping action described, are not impregnated with the elastomers that form the flexible covering 282. It will therefore be understood that the term "non-impregnated" used in the claims of the present application means that the elastomer covering material is confined to the outer region of the glass fiber pad. It will be understood that the term "non-impregnated" used in the claims does not preclude the possible use f non-binding lubricants which might be applied to the interior fibers of the pad to minimize abrasion.

It will also be understood that the term "non-impregnated" used in the claims does not preclude the use of the previously mentioned suitable resinous binder which bonds the fibers together at their cross-wise oriented intersections to provide the previously mentioned air spaces between the individual fibers.

It should be further pointed out that, if desired, the glass fiber pads 280 can be covered with a strong elastomer skin covering formed of neoprene, synthetic rubber, or other similar high strength materials. When these strong elastomers are used to form a water and air impervious covering for covering the glass fiber pads, the pads function as damped air springs as described in my co-pending application, Ser. No. 37,504 filed June 20, 1960, now Patent No. 3,095,187. In instances where high strength elastomer coatings are used and provided with a plurality of openings to form a previous covering for the pad the damping of modified air spring is modified as compared to the damping action provided by the pad when fluid impervious coverings are used.

It should be further pointed out that when high strength elastomer coatings are used it is important that the elastomers are confined to the outer regions of the glass fiber pad whereby the previously mentioned inter-fiber air spaces and pumping action are retained. Moreover, it has been found that the presence of high strength elastomers, such as neoprene, in the interstices of the pad form a progressively increasing bond between the fibers whereby resiliency of the isolator is lost.

The figure of merit for a vibration isolator is its transmissibility, the ratio of the transmitted vibratory force to the driving or forcing vibratory force, $$\text{Transmissibility} = \frac{\text{Transmitted force}}{\text{Driving force}}$$

In order to make this small, it is necessary that the isolator have a nautral or resonant frequency considerably lower than the frequency of the driving force. The resonant frequency is the number of cycles or vibrations per second at which an object on a resilient support will vibrate when it is pushed down and released suddenly. The frequency of the driving force is the number of force alternations per second. Thus, a shaft with a simple unbalance rotating at 1200 r.p.m. has a principal driving frequency of 1200/60 or 20 cycles per second (c.p.s.). Usually, the driving force has components having several frequencies but these can be considered separately with more attention to the lower frequencies where it is more difficult to isolate vibration.

Figure 8:
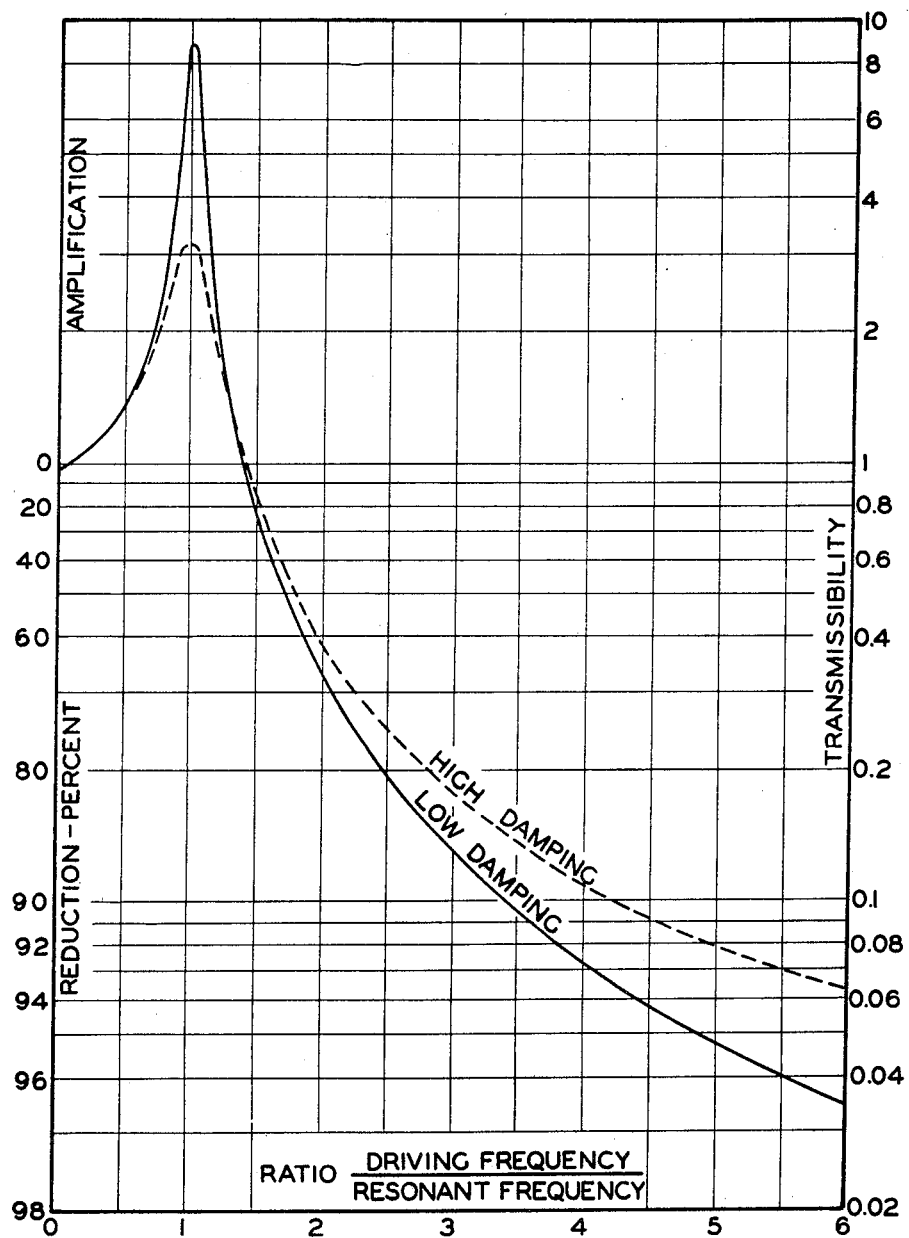
FIG. 8 is a graph illustrating a theoretical vibration isolation curve.

The way in which the transmissibility depends on the resonant and driving frequencies is shown in FIG. 8. It is seen that (1) the mounting is effective only for frequency ratios greater than 1.4 (below this, there is amplification of the driving force) and (2) for a given driving frequency, the lower the resonant ferquency can be made the lower the transmissibility will be.

A low resonant frequency is obtained if the stiffness of the isolator is small and the supported weight is large. This combination, however, means a soft support and a large deflection under a static load which may be objectionable because of stability, belt pull, etc. A compromise is often called for and a ratio of frequencies between about 2.5:1 to 4:1 can usually be tolerated. This gives a transmissibility between 0.2 and 0.1, or a reduction of the vibrating force between 80 and 90 percent.

Another fact affecting transmissibility is damping or energy absorption which brings vibrating systems more or less quickly to rest after the driving force has been removed. For example, an automobile has springs to provide a low frequency suspension and has shock absorbers which abstract energy and quickly bring the system to rest after going over a bump. Referring again to FIG. 8, two curves are shown, one for low damping and the other for high damping. Some damping is advantageous near the peak of the curve where the exciting force goes through the resonance region, as in a machine coming up to speed, since this reduces extreme amplitudes, but damping in the operating frequency (speed) region detracts from the vibration isolation effect. This harmful effect is ordinarily not great and, furthermore, the damping is advantageous at higher frequencies involved in noise and shocks where the simple theory does not hold.

It is pointed out that no vibration isolation mounting will be as effective as rated if the mounted machinery rests on a resonant or thin support of floor. Thus, machinery on a wooden floor or thin wall will be difficult to isolate.

There are other requirements for a practical vibration isolator aside from its performance in vibration. It must be able to withstand any thrusts necessary for the operation of the machine and must have a long life in spite of mechanical fatigue, corrosion, oxidation, contamination with dirt, oil, moisture, etc. and temperature variations. Glass fiber padding, when not overloaded, is a satisfactory material since it is rather inert chemically and is negligibly affected by the usual contaminants and temperatures.

In designing a vibration isolator, use has often been made in vibration manuals of curves of deflection under the gravity load of the machine plotted against the resonant frequency. The ratio of this frequency to the driving frequency has then been used to find the transmissibility. Except for special cases, including steel helical springs, this procedure gives lower transmissibility than is actually present. Most non-metallic materials such as rubber, plastics, and fibrous materials deflect slowly under load and also recover slowly. This non-linear action results in a dynamic stiffness for vibration which is two to four times the static stiffness under steady load. Information on transmissibility for the above materials must therefore be obtained from measurements under dynamic or vibratory test conditions.

Unlike rubber, the ratio of thickness to free surface is unimportant and a pad of large area will behave the same when it is cut up into a number of small pads of the same thickness.

Figure 9:
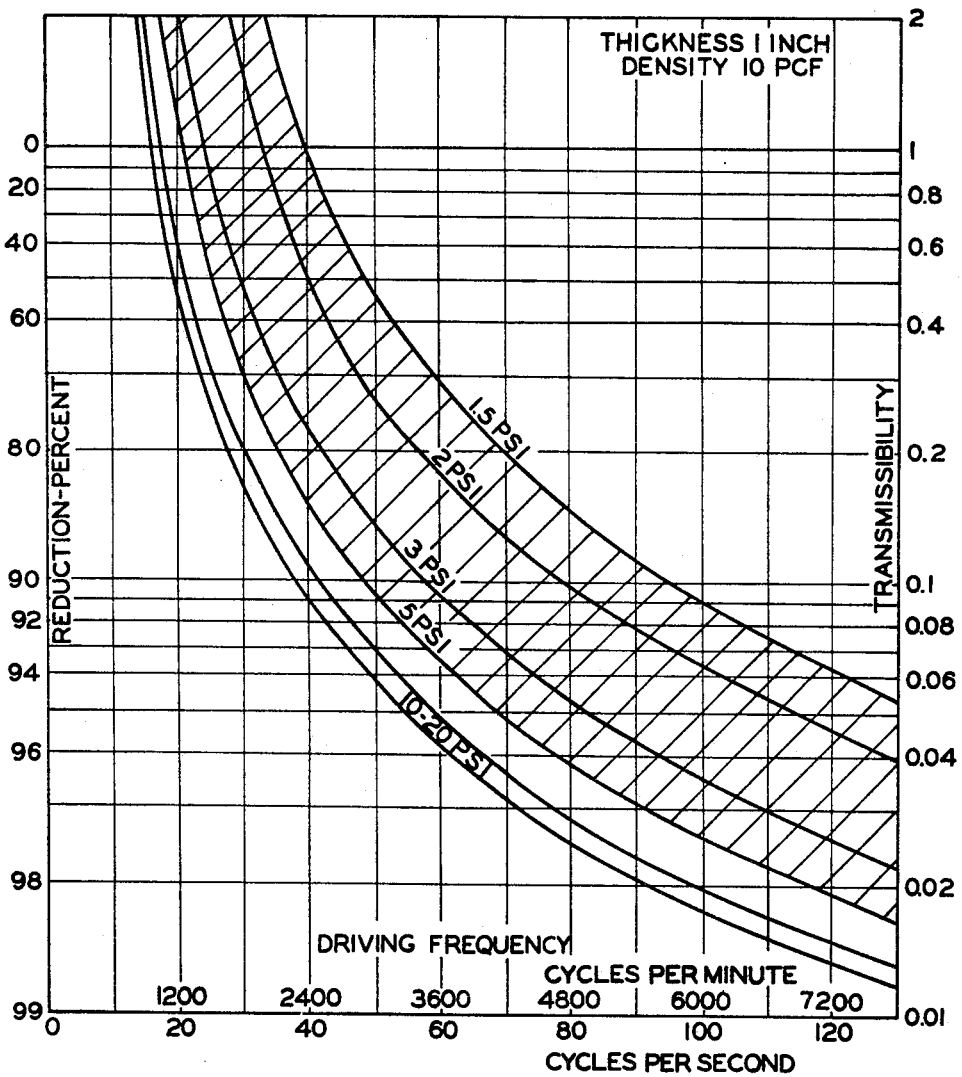
FIG. 9 is a graph showing the vibration isolation characteristics of one-inch thick glass fiber material.

Vibratory tests on glass fiber materials have been made over a considerable range of loads. The results, shown in FIG. 9 are typical for a specific density and can be used as a basis for the design of vibration isolators. Knowing the frequency of the driving force (horizontal scale), the transmissibility or vibration reduction (vertical scale) can be read from the curves for various loads and thicknesses.

For machinery vibration isolations, materials with densities of 10 pounds per cubic foot, or greater, are most practical from a load-bearing standpoint. Design curves are shown for glass fiber to be used as vibration isolation pads. Knowing the frequency of the driving force (horizontal scale), the desired transmissibility (vertical scale) can be found for various loads and thicknesses. One of the advantages of glass fiber material is that its vibration reduction is not as dependent on exact loading as the reduction for many other materials. This is because glass fiber material becomes stiffer as the load is increased and its effective resonant frequency changes less with load than the resonant frequency of many other materials. The charts show design characteristics for thicknesses of 1 and 2 inches. The reduction for other thicknesses can be found by using FIG. 9 for 1-inch and multiplying the actual driving frequency by the square root of the thickness.

Life tests under combined static and vibration loading have shown that glass fiber materials will stand up in general use at static load deflections of about 50 percent.

As an example in using the charts, assume that it is desired to reduce the vibration of a machine by 90 percent (to ten percent of the vibration force with no isolation). The machine weighs 100 pounds and as a driving frequency of 30 c.p.s. (a rotational speed of 1800 r.p.m.) with a simple unbalance load. On the design charts, the intersection of a horizontal line at 90 percent reduction with a vertical line at 30 c.p.s. driving frequency gives the static load. In FIG. 9 this point falls below the curves, which means that 90 percent reduction cannot be obtained for thicknesses of 1 inch or less. In FIG. 10, however, the point for 90 percent reduction at 30 c.p.s. falls just above the curves for a static pressure load of 10 to 20 p.s.i. The total area of isolating pads will be the total weight divided by the static pressure load, 50 to 100 square inches, and four pads about 4 x 4 inches should be satisfactory.

In operation, the supporting structure is designed in accordance with the graphs 9 and 10 or similar graphs for various other densities, taking into account the particular load to be supported and driving frequency to be encountered.

In accordance with the present invention it has been discovered that pads of glass fiber material of the type described herein have a unique characteristic that makes them particularly suitable for vibration isolation. This characteristic is the maintenance of constant natural frequency independent of the weight supported by the isolator. The advantage of this useful characteristic is only achieved if the pad of glass fiber material is properly loaded for any given natural frequency and for any given density of the glass fiber isolator.

FIG. 11 is a graph showing the variations of natural frequency $f_n$ with respect to variations in the load W supported by the isolator for various densities of glass fiber materials ranging between 8.4 and 19.5 pounds per cubic foot.

This unique characteristic of maintaining constant natural frequency can be defined mathematically since the glass fiber pads behave as isolators having a non-linear force-deflection curve whose stiffness $k_y$ remains proportional to the weight of the mounted body W at all points on the force-deflection curve. The right side of the below listed equation reduces to a constant, and the natural frequency becomes independent of the weight supported by the isolator.

(1)
$$f_n = 3.13 \sqrt{\frac{k_y}{W}}$$

Substituting $k_y = dW/d$ in Equation 1 (the force F is equal to the supported weight W) and rearranging terms:

(2)
$$\frac{4\pi^2 f_n^2}{g} d\delta = \frac{dW}{W}$$

An expression for the force deflection-curve is obtained from the integration of Equation 2. A family of curves results from this process, depending on the constant of integration. A particular curve is specified by selecting a point with the coordinates $W_0$, $\delta$ such that all points of the curve whose coordinates are numerically greater than $W_0$, $\delta_0$ will represent conditions of constant natural frequency. Integrating Equation 2:

(3)
$$\frac{4\pi^2 f_n^2}{g} \delta/\delta_0 = \log W w_0{}^W$$

Equation 3 may be written exponentially as follows:

(4)
$$W = W_0 e^{A(\delta - \delta_0)}$$

An isolator whose force-deflection curve conforms to Equation 4 thus exhibits a constant natural frequency $f_n$ when supporting any load greater than $W_0$.

Equation is obtained from Equation 1 as follows:
Equation 1

$$f_n = 3.13 \sqrt{\frac{k_y}{W}}$$

since $$\frac{\sqrt{g}}{2\pi} = 3.13$$

where $g = 386$ in./sec.$^2$
therefore $$f_n = \frac{1}{2\pi} \sqrt{\frac{k_y g}{W}}$$

let $$k_y = \frac{dW}{d\delta}$$

which is the slope of the load deflection curve.
therefore $$f_n = \frac{1}{2\pi} \frac{\sqrt{\frac{dW}{d} g}}{W}$$

$$f_n{}^2 = \frac{1}{4^2} \frac{dW}{d} \frac{g}{W}$$

$$\frac{4\pi^2 f_n{}^2}{g} Dd\delta = \frac{dW}{W}$$

In going from Equation 1 to Equation 2 the dimensions of $f_n$ have been changed to radians per second. It will, therefore, be understood that "3.13" does not represent $\pi$ in Equation 1 but rather the value set forth above. In view of the above it will be understood why $4\pi^2/g$ appears in Equation 2.

With reference to FIG. 11 the natural frequency of curve C (19.5 pounds per cubic foot density) remains substantially constant at 780 cycles per minute when the weight of the mounted body W is greater than $W_0$, with $W_0$ being equal to approximately 17 pounds as seen from the abscissa of the graph of FIG. 11 when the weight W of the mounted body is less than $W_0$ (17 pounds), the natural frequency shows the inverse tendency which is characteristic of linear isolators.

With continued reference to FIG. 11, the characteristic of a lower density isolator is illustrated by curve D. Curve D represents a density of the glass fiber material of 8.4 pounds per cubic foot. Here $W_0$ occurs approximately at 3¼ pounds load. Above this loading natural frequency remains substantially constant with variation in load and below this loading the natural frequency shows the inverse tendency which is characteristic of linear isolators.

In the formulas previously discussed herein the following symbols are defined as follows:

W = actual load applied to isolator
$W_0$ = load above which natural frequency is independent of variations in load W
$\delta$ = deflection of isolator under load W
$\delta_0$ = deflection of isolator under load $W_0$
$f_n$ = natural frequency
$k_y$ = stiffness of isolator
$e$ = the basis of the Napierian system of logarithms
$g$ = gravitational constant
$\pi$ = 3.1416

$$A = \frac{\pi^2 f_n{}^2}{g}$$

While the forms of embodiments of the present invention as herein disclosed constitute preferred forms, it is to be understood that other forms might be adopted, all coming within the scope of the claims which follow:

We claim:

1. A vibration isolation floor support system having a substantially constant natural frequency under variations in the weight of a supported load, said system comprising, a structural floor including an upper surface; a plurality of isolator stations in spaced relationship on said upper surface, each of said isolator stations comprising a pad of glass fiber material, a covering on said pad, the interior regions of said pad including interstices non-impregnated with respect to said covering, the diameter of the fibers of said pad being less than .0005 of an inch, the densities of said pad being greater than eight pounds per cubic foot; a supported floor including a layer of sheathing on top of said pads and a concrete slab on said sheathing, said pads being sized and positioned in preselected spaced relationship to establish a preselected loading per unit area so as to load the system to provide a substantially constant natural frequency under variations in the weight of the load being supported.

2. The vibration isolation floor system defined in claim 1 wherein said covering comprises an impervious elastomeric coating.

3. A vibration isolation floor support system having a substantially constant natural frequency under variations in the weight of a supported load, said system comprising a structural floor including an upper surface; a plurality of isolator stations in spaced relationship on said upper surface, each of said isolator stations comprising a pad of glass fiber material, a covering on said pad, the interior regions of said pad including interstices non-impregnated with respect to said covering, said pad having a force deflection curve conforming to the equation $W = W_o e^{A(\delta - \delta_o)}$ a supported floor including an under surface supported by said isolator stations; and a load supported by said floor, said load and said floor having a weight substantially equal to or greater than $W_o$, the symbol in said equation being defined as follows:

$W$ = actual load applied to the pad
$W_o$ = load above which the natural frequency of the system is independent of variations in the actual load $W$
$e$ = the base for the Napierian system of logarithms $$A = \frac{4\pi^2 f_n^2}{g}$$

$\delta$ = deflection of the pad under load $W$
$\delta_o$ = deflection of the pad under load $W_o$
$\pi$ = 3.1416
$f_n$ = the natural frequency of the system
$g$ = the gravitational constant said supported floor including a layer of sheathing on top of said pads; and a poured concrete slab on said sheathing.

4. The vibration isolation floor system defined in claim 3 wherein said covering comprises an impervious elastomeric coating.

References Cited

UNITED STATES PATENTS

| | | |
|---|---|---|
| 1,789,576 | 1/1931 | Bowman _____ 52—403 |
| 2,600,843 | 6/1952 | Bush. |
| 2,766,163 | 10/1956 | Schwartz. |
| 2,769,741 | 11/1956 | Schwartz. |
| 3,018,991 | 1/1962 | Slayter. |

JOHN E. MURTAGH, Primary Examiner

U.S. Cl. X.R.

248—358; 52—403